United States Patent
Herrington et al.

(10) Patent No.: US 11,890,889 B2
(45) Date of Patent: Feb. 6, 2024

(54) METAL TRANSACTION CARD WITH REMOVABLE INDICIA

(71) Applicant: Capital One Services, LLC, McLean, VA (US)

(72) Inventors: Daniel Herrington, New York, NY (US); Tyler Maiman, Melville, NY (US); Stephen Schneider, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 268 days.

(21) Appl. No.: 17/318,695

(22) Filed: May 12, 2021

(65) Prior Publication Data

US 2021/0260908 A1    Aug. 26, 2021

Related U.S. Application Data (63) Continuation of application No. 16/410,093, filed on May 13, 2019, now Pat. No. 11,034,181.

(51) Int. Cl.
| | |
|---|---|
| *B42D 25/45* | (2014.01) |
| *B42D 25/346* | (2014.01) |
| *B42D 25/369* | (2014.01) |
| *G06K 19/06* | (2006.01) |

(52) U.S. Cl.
CPC ......... *B42D 25/346* (2014.10); *B42D 25/369* (2014.10); *B42D 25/45* (2014.10); *G06K 19/06196* (2013.01)

(58) Field of Classification Search
CPC ....... G06K 19/06196; G06K 19/06187; G06K 19/00
See application file for complete search history.

(56) References Cited

U.S. PATENT DOCUMENTS

| | | | | |
|---|---|---|---|---|
| 3,230,650 | A * | 1/1966 | Orkin ..................... | B42D 25/00 283/901 |
| 3,810,566 | A * | 5/1974 | Adams ..................... | G09F 3/00 40/709 |
| 5,489,123 | A * | 2/1996 | Roshkoff ............... | B42D 15/00 283/61 |
| 5,700,037 | A * | 12/1997 | Keller .................... | B42D 25/00 283/901 |
| 6,679,970 | B2 * | 1/2004 | Hwang ................ | B42D 15/025 283/105 |

(Continued)

FOREIGN PATENT DOCUMENTS

| | | | |
|---|---|---|---|
| CN | 207617371 U | * | 7/2018 |
| CN | 109484058 A | * | 3/2019 |

(Continued)

*Primary Examiner* — Christopher Stanford
(74) *Attorney, Agent, or Firm* — KDW Firm PLLC (57) ABSTRACT

Metal transaction cards with removable indicia are provided. In some approaches, a transaction card may include a metal body having a first main side and a second main side, and an identification chip coupled to the first main side of the metal body. The transaction card may further include an exterior layer along the second main side, the exterior layer containing identifying indicia, wherein at least a portion of the exterior layer is removable from the second main side by at least one of: a set of perforations through the exterior layer, and a channel provided along an outer edge of the second main side.

20 Claims, 6 Drawing Sheets

(56) References Cited

U.S. PATENT DOCUMENTS

| | | | |
|---|---|---|---|
| 7,516,900 B2 * | 4/2009 | Janczek | G06K 19/08 235/487 |
| 8,523,062 B2 * | 9/2013 | Varga | G06K 19/07745 235/492 |
| 8,803,656 B2 * | 8/2014 | Tamezane | E05B 35/007 340/10.2 |
| 9,595,211 B2 * | 3/2017 | Lim | B32B 15/12 |
| 10,373,040 B2 * | 8/2019 | Tomczyk | B42D 25/346 |
| 2008/0186186 A1 * | 8/2008 | Campbell | G06K 19/025 340/572.8 |

FOREIGN PATENT DOCUMENTS

| | | | | |
|---|---|---|---|---|
| DE | 19921525 C2 * | 3/2001 | | G06K 19/077 |
| FR | 2718549 A1 * | 10/1995 | | G06K 19/077 |
| JP | H10255011 A * | 9/1998 | | |
| JP | 2002014614 A * | 1/2002 | | |
| JP | 2004265374 A * | 9/2004 | | G06K 19/07728 |
| JP | 2015016625 A * | 1/2015 | | A45C 11/182 |
| JP | 2018140620 A * | 9/2018 | | |
| JP | 2018167575 A * | 11/2018 | | G06T 17/00 |

\* cited by examiner

METAL TRANSACTION CARD WITH REMOVABLE INDICIA

CROSS-REFERENCE TO RELATED APPLICATIONS

This application is a continuation of U.S. patent application Ser. No. 16/410,093, entitled "METAL TRANSACTION CARD WITH REMOVABLE INDICIA" filed on May 13, 2019. The contents of the aforementioned application are incorporated herein by reference in their entirety.

FIELD

Embodiments of the present disclosure relate to transaction cards and, more particularly, to metal transaction cards with removable indicia.

BACKGROUND

Financial cards, such as credit cards and debit cards, typically contain account information such as the account number, owner's name, and expiration date. This information may be provided in different formats, and at different positions along the card. In one format, text is embossed into or printed on the plastic for use visually. In a second format, a magnetic stripe containing the information in a computer-readable form may be provided along the back of the card. When the card is no longer useful, such as after the card is expired or is cancelled, it is desirable to destroy the information recorded on the card for security reasons.

The current approach for destruction of plastic cards is to cut the card into a number of small pieces so that it is difficult to reconstruct the data from the pieces. However, with metal cards this method of destruction is not easily achieved. Therefore, metal cards are typically shipped to a controlled destruction center for shredding, resulting in increased costs. Thus, it would be desirable to have a method to physically remove sensitive information present on the metal card without the need to physically destroy the entire card.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In at least one approach according to the disclosure, a transaction card may include a metal body having a first main side and a second main side, and an identification chip coupled to the first main side of the body. The transaction card may further include an exterior layer along the second main side, the exterior layer containing identifying indicia, wherein at least a portion of the exterior layer is removable from the second main side by at least one of: a set of perforations through the exterior layer, and a channel provided along an outer edge of the second main side.

In another approach according to the disclosure, a contactless identification card may include a metal body including a first main side opposite a second main side, a first end opposite a second end, and a first side opposite a second side. The contactless identification card may further include an identification chip coupled to the first main side of the body, and an exterior layer along the second main side, the exterior layer containing identifying indicia. At least a portion of the exterior layer may contain at least a part of the identifying indicia is removable from the second main side by at least one of: a set of perforations through the exterior layer, and a channel provided along an outer edge of the second main side.

In yet another approach according to the disclosure, a method may include providing a metal body including a first main side opposite a second main side, a first end opposite a second end, and a first side opposite a second side. The method may further include coupling an identification chip to the first main side of the body, and providing an exterior layer along the second main side, the exterior layer containing identifying indicia. The method may further include providing at least one of the following features along the second main side to enable removal of at least a portion of the exterior layer containing at least a part of the identifying indicia: a set of perforations through the exterior layer, and a channel provided along an outer edge of the second main side.

BRIEF DESCRIPTION OF THE DRAWINGS

The accompanying drawings illustrate example approaches of the disclosure, including the practical application of the principles thereof, as follows.

The drawings are not necessarily to scale. The drawings are merely representations, not intended to portray specific parameters of the disclosure. The drawings are intended to depict example embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, some reference numbers may be omitted in certain drawings.

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so this disclosure will be thorough and complete, and will fully convey the scope of the subject matter to those skilled in the art. In the drawings, like numbers refer to like elements throughout.

Embodiments herein are directed to metal transaction cards, such as credit and debit cards, having a perforated section in an exterior layer thereof so that a user can easily separate indicia (e.g., a card number) from the card without compromising the card integrity. In some embodiments, the transaction card may include a notch, channel, or recess along an outer edge thereof to make separation of the exterior layer from the transaction card easier. Unlike current metal transaction cards, which must be shipped to a controlled destruction center for shredding, the transaction cards of the present disclosure provide a removable area in the pre-laminate on the top coat, or laser-receptive layer, which allows users to more easily separate the numbers from the card. As a result, sensitive account information can be destroyed separate from the rest of the transaction card.

Figure 1A:
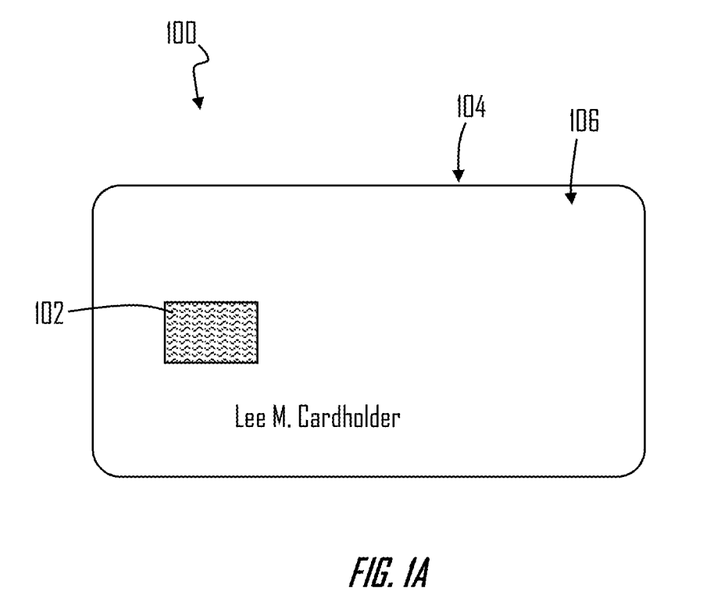
FIG. 1A is a top view illustrating a transaction card, in accordance with embodiments of the present disclosure.
Figure 1B:
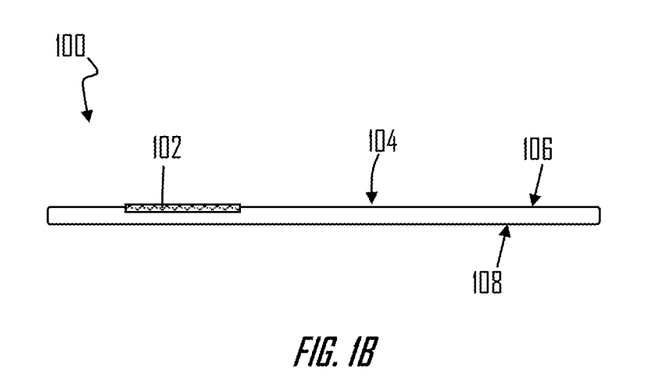
FIG. 1B is a side view illustrating the transaction card of FIG. 1A, in accordance with embodiments of the present disclosure.

Referring now to FIGS. 1A-1B, an example transaction card (hereinafter "card") 100 according to embodiments of the disclosure will be described. The card 100 may be a contactless credit or debit card, a RFID passport, or an access card. As will be described in greater detail herein, the card 100 may include multiple layers each having one or more functions. Although non-limiting, a body 104 of the card 100 may be made from a non-plastic material, such as steel, copper, aluminum, silver, gold, platinum, or a different alloy. Described herein as contactless due to the method of communication by an identification chip 102, such as a RFID chip, the card 100 may also provide one or more functions requiring contact. For example, the card 100 may include a conventional magnetic stripe and/or a microchip connected to contacts present on an outer layer of the card 100.

As shown, the body 104 of the card 100 may be a metal core having a first main side 106 and a second main side 108 opposite the first main side 106. Although non-limiting, the first main side 106 may correspond to a front or top side of the card 100, while the second main side 108 may correspond to a back or bottom side of the card 100. The identification chip 102 may be coupled (e.g., recessed or partially embedded) to the first main side 106 of the card 100. As used herein, the identification chip 102 may be any microprocessor device configured to exchange data electromagnetically, such as a RFID chip. The RFID chip may include a radio frequency inductor, volatile or non-volatile memory storage, a microprocessor, circuitry logic, and/or an antenna. While in some embodiments electromagnetic data communications from the RFID chip will take place at radio frequencies, other embodiments may exchange electromagnetic data at different frequencies.

Figure 1C:
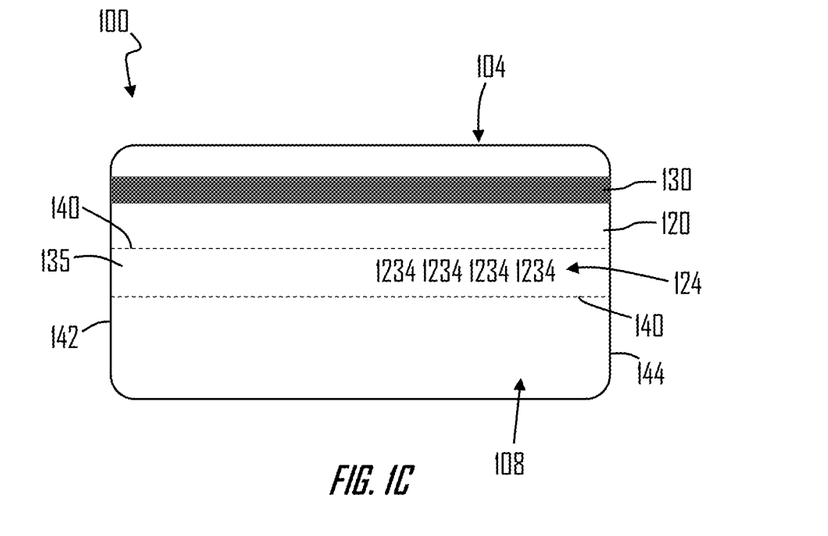
FIG. 1C is a bottom view illustrating the transaction card of FIG. 1A, in accordance with embodiments of the present disclosure.
Figure 1D:
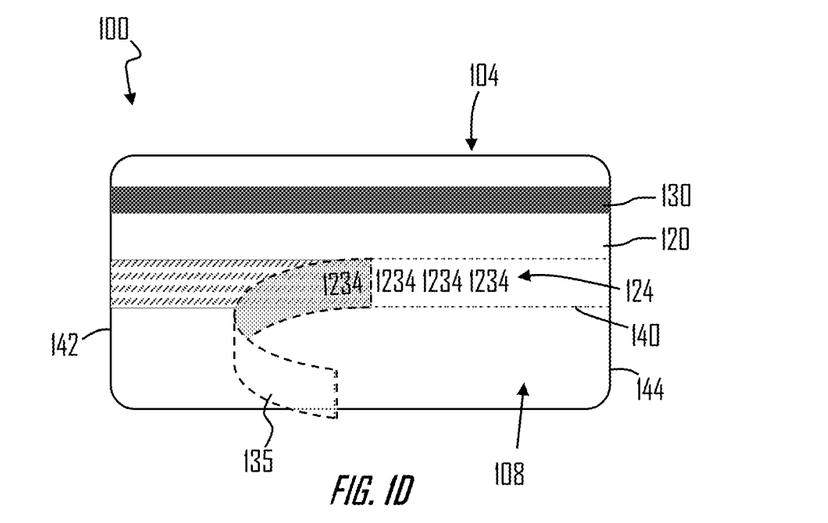
FIG. 1D is a bottom perspective view illustrating the transaction card of FIG. 1A, in accordance with embodiments of the present disclosure.

FIGS. 1C-1D depict the second main side 108 of the card 100. As shown, the second main side 108 may include an exterior layer 120 containing identifying indicia 124, such as an account or card number. Although non-limiting, the card number may be a 16-digit number (e.g., four groups of four digits). In other embodiments, the card number may include a different number of digits. The identifying indicia 124 may be printed over/on the exterior layer 120. However, one skilled in the art will appreciate that the printing of the identifying indicia 124, along with any other indicia, logos, etc., may be applied to any surface or layer of the card 100. Moreover, any suitable printing, scoring, imprinting, marking or like method is within the scope of the present disclosure.

The exterior layer 120 may be a polymer-based material, e.g., a polyester, polyvinylchloride (PVC), polypropylene, polyethylene, acrylic, polycarbonate, and/or like material. Although non-limiting, the exterior layer 120 may be transparent. In other embodiments, the exterior layer 120 may be formed of an acrylic resin (e.g., any of numerous thermoplastic or thermosetting polymers or copolymers of acrylic acid, methacrylic acid, any esters of these acids, or acrylonitrile), ultra violet (UV) curable resin blend including polyester, urethane, diol and carboxyl acrylates with ceramic particles, multifunctional acrylate polymers or any like material. The clear coat resin layer may be applied (or formed) by spraying, screen printing, painting, powder coating or any other like method, and cured (processed) by UV cure, electron beam curing, oven heat, or any radiation curing method or in any other suitable manner.

As further shown, the card 100 may also include a magnetic stripe 130 provided on the second main side 108 of the body 104. In some embodiments, the magnetic stripe is part of the exterior layer 120. In other embodiments, the magnetic stripe 130 is disposed atop or beneath the exterior layer 120. The magnetic stripe 130 may contain cardholder data in accordance with standard protocols. For example, in some embodiments, the magnetic stripe 130 includes three tracks, often designated as track 1, track 2, and track 3. Many payment cards, such as credit cards or debit cards, have a magnetic stripe that includes two tracks, such as a magnetic stripe that includes tracks 1 and 2. Other cards have a magnetic stripe that includes three tracks. Many card readers can read a magnetic stripe that includes three tracks, and in cases where the payment card includes a magnetic stripe with only two tracks, the card reader's ability to read a third track is unused. In non-limiting embodiments, when the magnetic stripe 130 is encoded with account data of the card 100 using two tracks, the account data of the card 100 can be encoded in tracks 1 and 2. Track 3 of the magnetic stripe 130 may be unused and devoid of valid data in such a situation.

Although not shown, the card 100 may include second identifying indicia disposed on the second main side 108 thereof. For example, the second identifying indicia may be a card verification value (CVV), such as a 3-digit number. Depending on the type of card, the second identifying indicia may be present on or near a signature strip.

As further shown in FIGS. 1C-1D, at least a portion 135 of the exterior layer 120 is removable from the second main side 108 of the body 104 by a set of perforations 140 formed through the exterior layer 120. The perforations 140 may extend between a first end 142 and a second end 144 of the body 104. As shown, the portion 135 of the exterior layer 120 includes one or more digits of the identifying indicia 124. In some embodiments, all the digits of the identifying indicia 124 may be located on the portion 135. As a result, a user may tear the portion 135 of the exterior layer 120 away from the second main side 108, thereby removing the identifying indicia 124 without having to destroy the entire card 100. The portion 135 of the exterior layer 120 containing the identifying indicia 124 may then be discarded or destroyed by virtually any means, such as by shredding.

Figure 2:
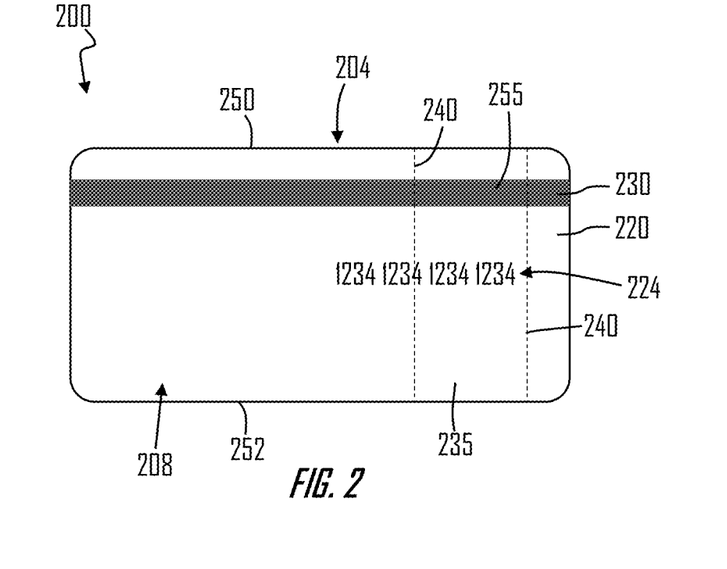
FIG. 2 is a bottom view illustrating a transaction card, in accordance with embodiments of the present disclosure.

In the embodiment shown in FIGS. 1C-1D, the perforations 140 may extend parallel to the magnetic stripe 130. In other embodiments, as shown in FIG. 2, the perforations 240 may be oriented substantially perpendicular to the magnetic stripe 230. For example, the perforations 240 may extend between a first side 250 and a second side 252 of the body 204 of the card 200. In some embodiments, the perforations 240 may also extend through the magnetic stripe 230. As shown, the portion 235 of the exterior layer 220 includes one or more digits of the identifying indicia 224. In some embodiments, the portion 235 of the exterior layer 220 may also include a portion 255 of the magnetic stripe 230. As a result, a user may tear the portion 235 of the exterior layer 220 away from the second main side 208, thereby removing at least some of the identifying indicia 224 and/or the magnetic stripe 230. By removing both the portion 255 of the magnetic stripe 230 and the identifying indicia 224, security of the data on the card 200 may be enhanced.

Figure 3A:
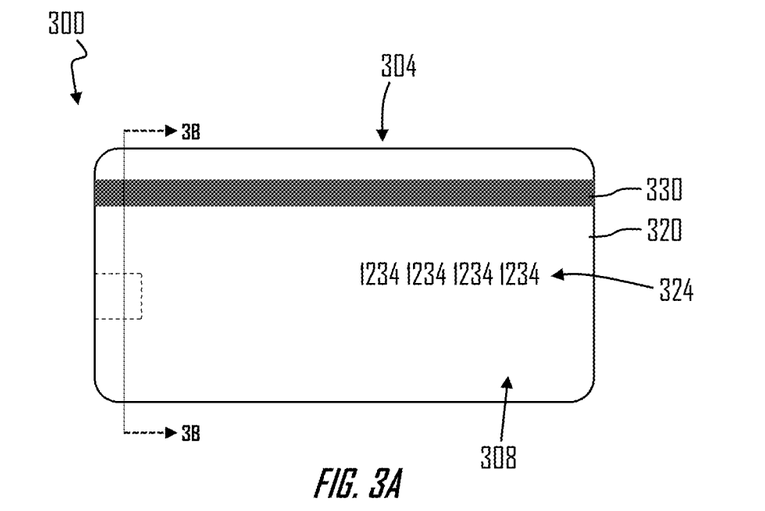
FIG. 3A is a bottom view illustrating a transaction card, in accordance with embodiments of the present disclosure.
Figure 3B:
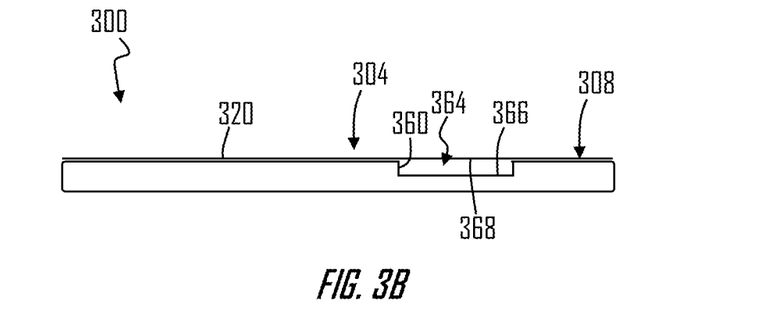
FIG. 3B is a side cross-sectional view illustrating the transaction card of FIG. 3A, in accordance with embodiments of the present disclosure.
Figure 3C:
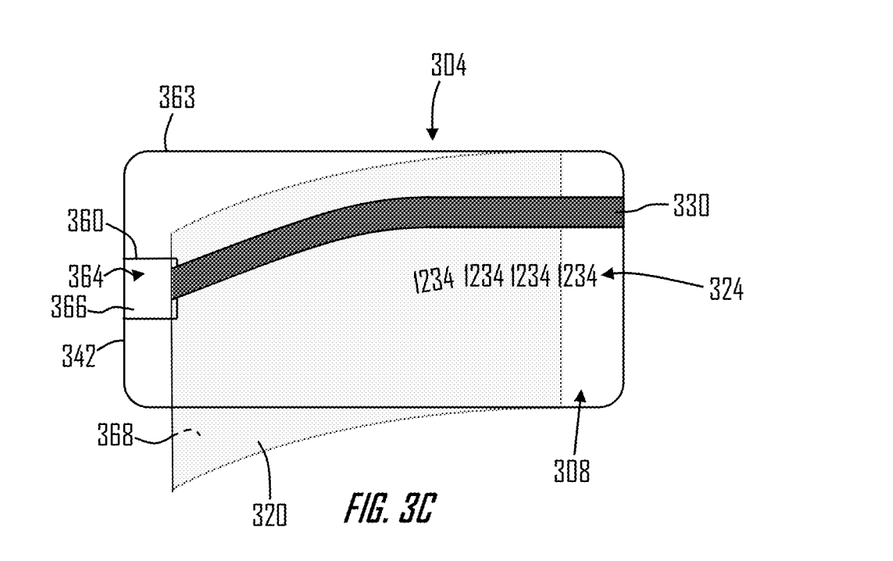
FIG. 3C is a bottom perspective view illustrating the transaction card of FIG. 3A, in accordance with embodiments of the present disclosure.

Turning now to FIGS. 3A-3C, a card 300 according to embodiments of the present disclosure will be described in greater detail. In the non-limiting embodiment shown, the second main side 308 of the card 300 may include the exterior layer 320 containing identifying indicia 324, such as an account or card number. As further shown, the card 300 may also include a magnetic stripe 330 provided on the second main side 308 of the body 304. In some embodiments, the magnetic stripe 330 is part of the exterior layer 320.

As better shown in FIGS. 3B-3C, the card 300 may further include one or more channels 360 provided along an outer edge 363 of the second main side 308. In the non-limiting embodiment shown, the channel 360 is recessed into the second main side 308, along the first end 342 of the body 304. The channel 360 may define a cavity 364 between a surface 366 of the channel 360 and an inner surface 368 of the exterior layer 320. The cavity 364 may permit a user, for example via an instrument or finger, to more easily engage the exterior layer 320 for removal of the entire exterior layer 320 from the second main side 308 of the card 300, as demonstrated in FIG. 3C. The exterior layer 320 may be removed, thereby removing the identifying indicia 324 and the magnetic stripe 330 without having to destroy the rest of the card 300. The exterior layer 320 may then be discarded or destroyed by virtually any means, such as by shredding.

Figure 4A:
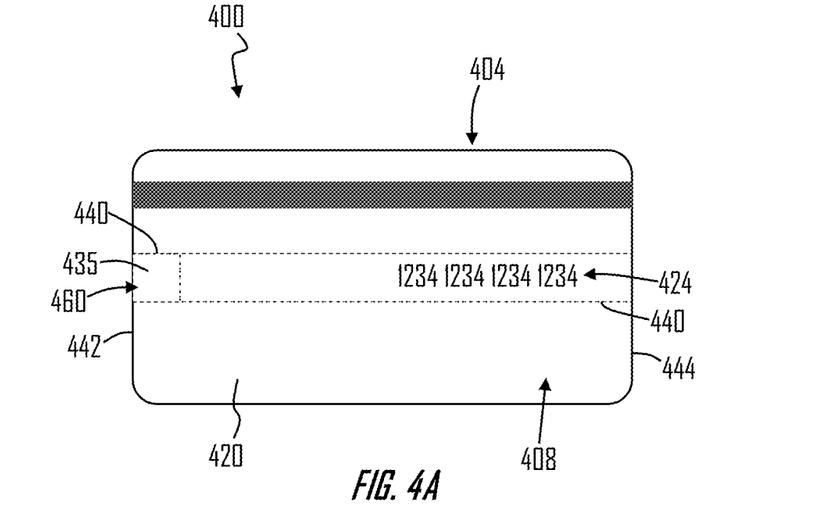
FIG. 4A is a bottom view illustrating a transaction card, in accordance with embodiments of the present disclosure.
Figure 4B:
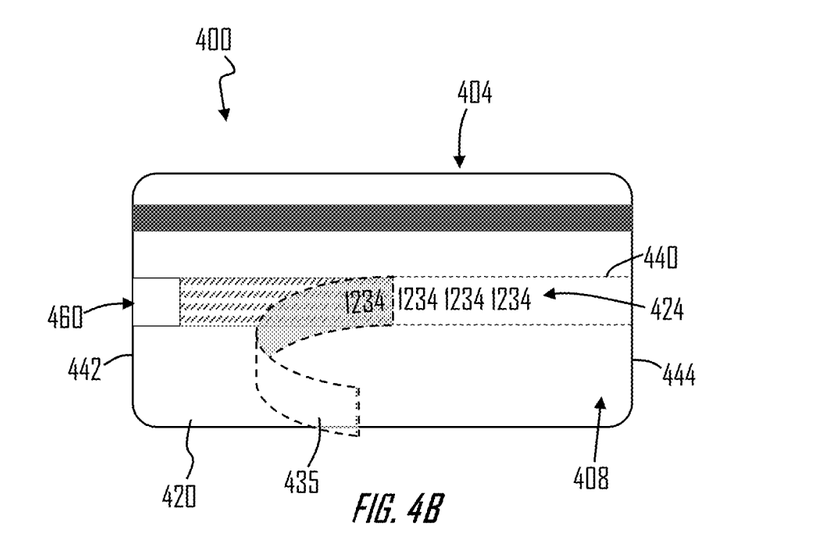
FIG. 4B is a bottom perspective view illustrating the transaction card of FIG. 4A, in accordance with embodiments of the present disclosure.

As shown in FIGS. 4A-4B, the card 400 may include both perforations 440 and the channel 460 to facilitate removal of the identifying indicia 424. For example, the channel 460 may reside beneath the portion 435 of the exterior layer 420, wherein the portion 435 is removable from the second main side 408 of the body 404. The perforations 440 may extend between the first end 442 and a second end 444 of the body 404. As shown, the portion 435 of the exterior layer 420 includes one or more digits of the identifying indicia 424. In the embodiment shown, all the digits of the identifying indicia 424 may be located on the portion 435. As a result, a user may tear the portion 435 of the exterior layer 420 away from the second main side 408, thereby removing the identifying indicia 424 without having to destroy the entire card 400.

Figure 5:
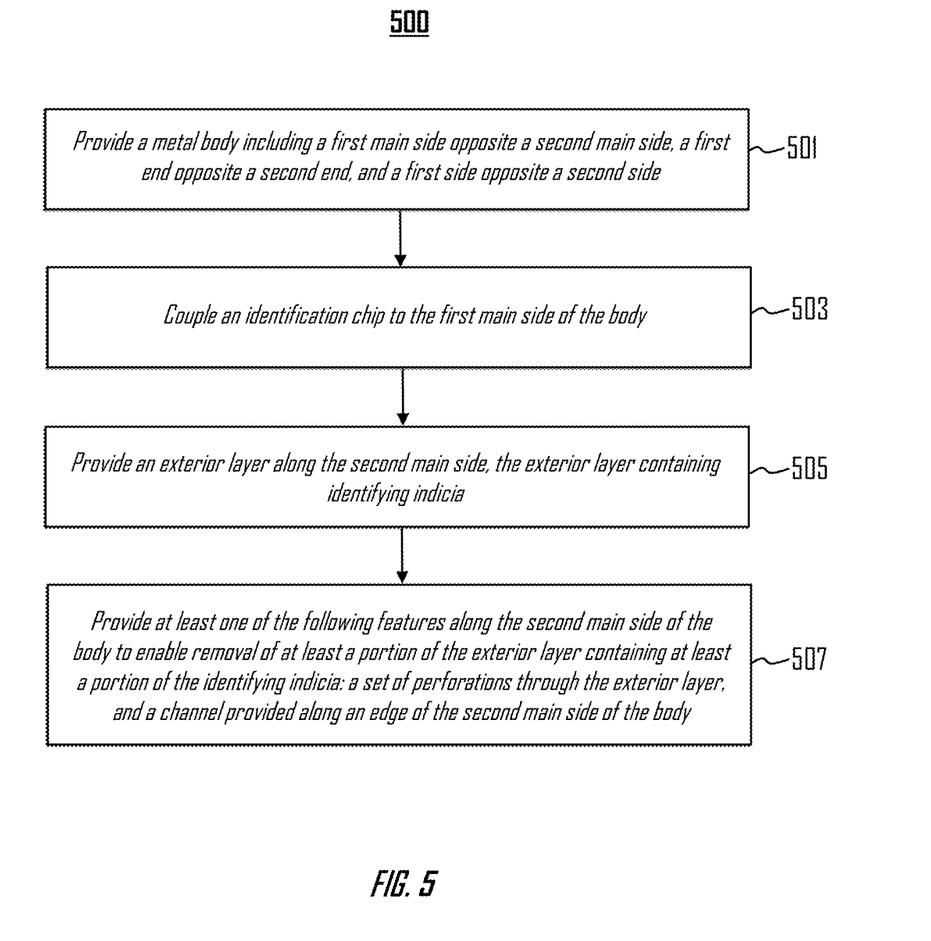
FIG. 5 illustrates a flowchart for performing methods in accordance with embodiments of the present disclosure.

Turning now to FIG. 5, a method 500 according to non-limiting embodiments of the present disclosure will be described. The method 500 will be described in conjunction with the representations shown in FIGS. 1A-4B. At block 501, the method 500 may include providing a metal body including a first main side opposite a second main side, a first end opposite a second end, and a first side opposite a second side. In some embodiments, the metal body may be steel, copper, aluminum, silver, gold, platinum, or a different alloy.

At block 503, the method 500 may include coupling an identification chip to the first main side of the body. At block 505, the method 500 may include providing an exterior layer along the second main side, the exterior layer containing identifying indicia. In some embodiments, the identifying indicia is an account or card number. In some embodiments, the exterior layer is an outer back laminate with a signature panel, applied magnetic stripe, the identifying indicia, and other indicia (e.g., card issuer, CVV code, etc.).

At block 507, the method 500 may include providing at least one of the following features along the second main side of the body to enable removal of at least a portion of the exterior layer containing at least a part of the identifying indicia: a set of perforations through the exterior layer, and a channel provided along an outer edge of the second main side of the body. In some embodiments, the channel is recessed into the second main side of the body, wherein the channel defines a cavity between a surface of the channel and an inner surface of the exterior layer. In some embodiments, the set of perforations extend between the first end and the second end, or between first side and the second side. In some embodiments, the card may include the magnetic stripe along the second main side, wherein the set of perforations extend through the magnetic stripe.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary. Although non-limiting, the cards 100, 200, 300, and 400 described herein may have standardized dimensions. For example, ISO/IEC 7816 is an international standard related to electronic identification cards with contacts, especially smart cards, managed jointly by the International Organization for Standardization (ISO) and the International Electrotechnical Commission (IEC). There are other standards, however, such as ISO/IEC 14443 for contactless cards (PayPass, PayWave, ExpressPay). A further standard ISO/IEC 7810 ID-1, with which most credit cards are compliant, defines dimensions as 85.60×53.98 mm (3.370×2.125 in) and a thickness of 0.76 mm (0.030 in).

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

Still furthermore, although the illustrative method 500 is described above as a series of acts or events, the present disclosure is not limited by the illustrated ordering of such acts or events unless specifically stated. For example, some acts may occur in different orders and/or concurrently with other acts or events apart from those illustrated and/or described herein, in accordance with the disclosure. In addition, not all illustrated acts or events may be required to implement a methodology in accordance with the present disclosure. Furthermore, the method 500 may be implemented in association with the formation and/or processing of structures illustrated and described herein as well as in association with other structures not illustrated.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

The invention claimed is:

1. A contactless card, comprising:
a metal body having a first main side and a second main side; and
an exterior layer overlaying an entirety of the second main side, the exterior layer including identifying indicia, wherein the entire exterior layer is removable from the second main side by using a cavity between the exterior layer and a channel recessed into the second main side.

2. The contactless card of claim 1, wherein the exterior layer comprises a magnetic stripe.

3. The contactless card of claim 1, wherein the identifying indicia comprises a plurality of digits.

4. The contactless card of claim 1, wherein the second main side comprises the channel along an outer edge of the second main side.

5. The contactless card of claim 4, wherein the channel is recessed into the second main side of the metal body.

6. The contactless card of claim 4, wherein the channel defines the cavity between a surface of the channel and an inner surface of the exterior layer.

7. The contactless card of claim 6, wherein the cavity is engageable via an instrument or a finger to remove the entire exterior layer from the second main body.

8. The contactless card of claim 1, comprising a microchip coupled to the first main side of the metal body.

9. The contactless card of claim 1, wherein the identifying indicia comprises an account number.

10. The contactless card of claim 1, wherein the second main side comprises a card verification value (CVV).

11. The contactless card of claim 1, wherein the second main side comprises a signature strip.

12. A transaction card, comprising:
a metal body having a first main side and a second main side; and
an exterior layer overlaying an entirety of the second main side, the exterior layer including a magnetic stripe, wherein the entire exterior layer is removable from the second main side by using a cavity between the exterior layer and a channel recessed into the second main side.

13. The transaction card of claim 12, wherein the exterior layer comprises identifying indicia.

14. The transaction card of claim 13, wherein the identifying indicia comprises a plurality of digits.

15. The transaction card of claim 12, wherein the second main side comprises the channel along an outer edge.

16. The transaction card of claim 15, wherein the channel is recessed into the second main side of the metal body.

17. The transaction card of claim 15, wherein the channel defines the cavity between a surface of the channel and an inner surface of the exterior layer.

18. The transaction card of claim 17, wherein the cavity is engageable via an instrument or a finger to remove the entire exterior layer from the second main body.

19. The transaction card of claim 12, comprising a microchip coupled to the first main side of the metal body.

20. The transaction card of claim 12, wherein the second main side comprises a signature strip.

* * * * *